L. N. D. WILLIAMS.
MACHINE FOR UNITING KNITTED WEBS.
APPLICATION FILED JAN. 20, 1916. RENEWED FEB. 6, 1917.

1,239,241.

Patented Sept. 4, 1917.
6 SHEETS—SHEET 1.

INVENTOR
LOUIS N. D. WILLIAMS
BY HIS ATTORNEY
Harry Dewitt

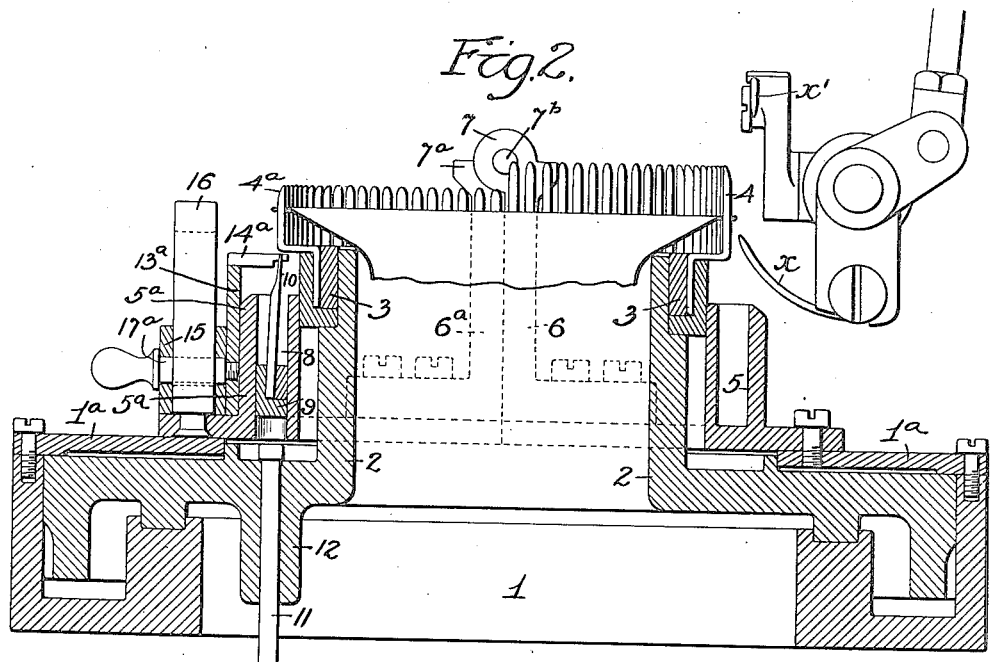
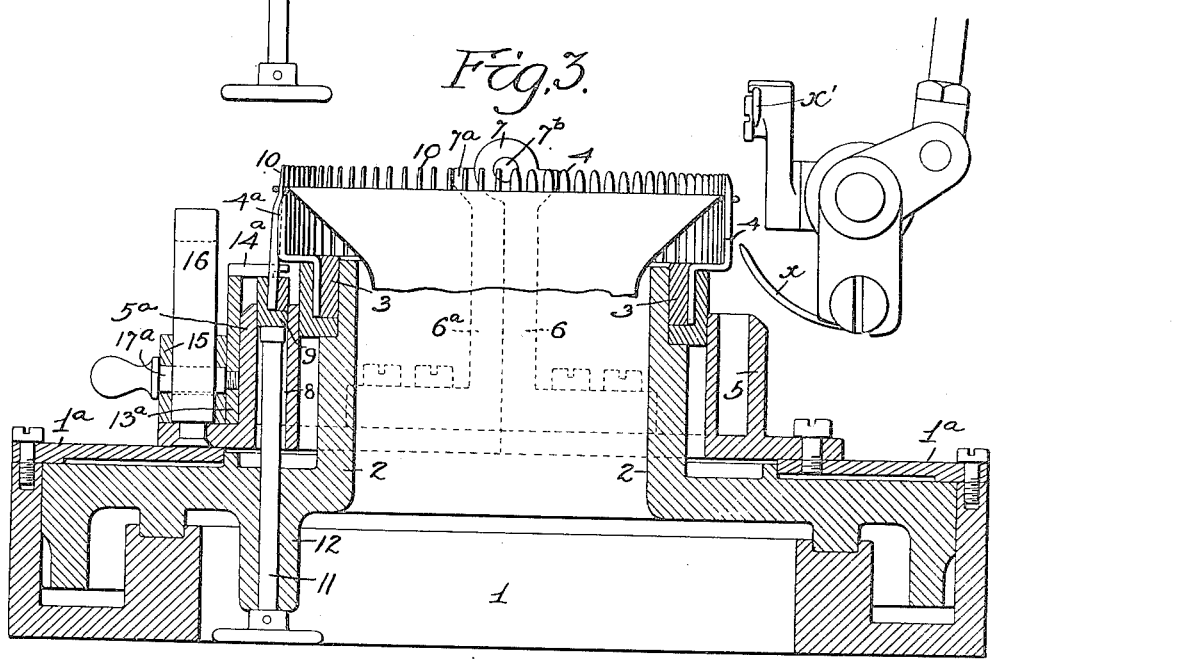

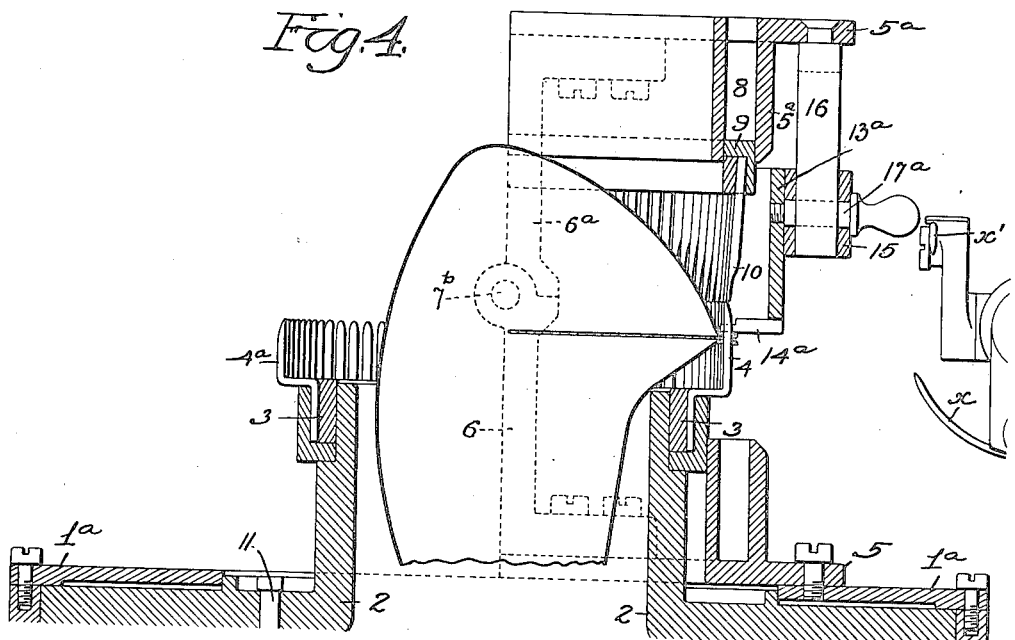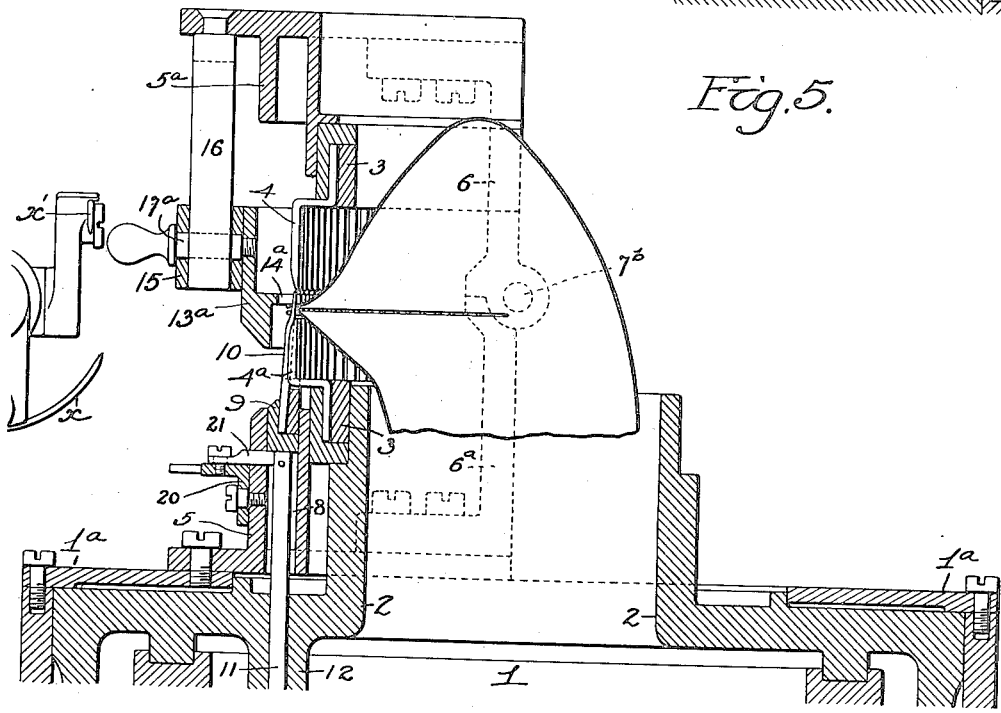

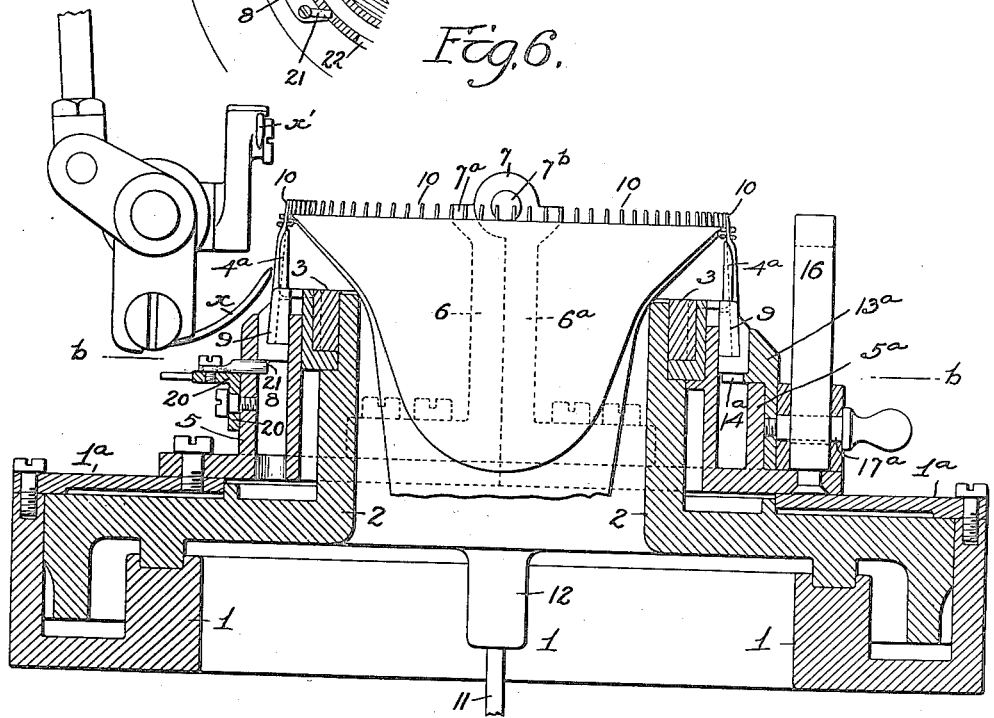

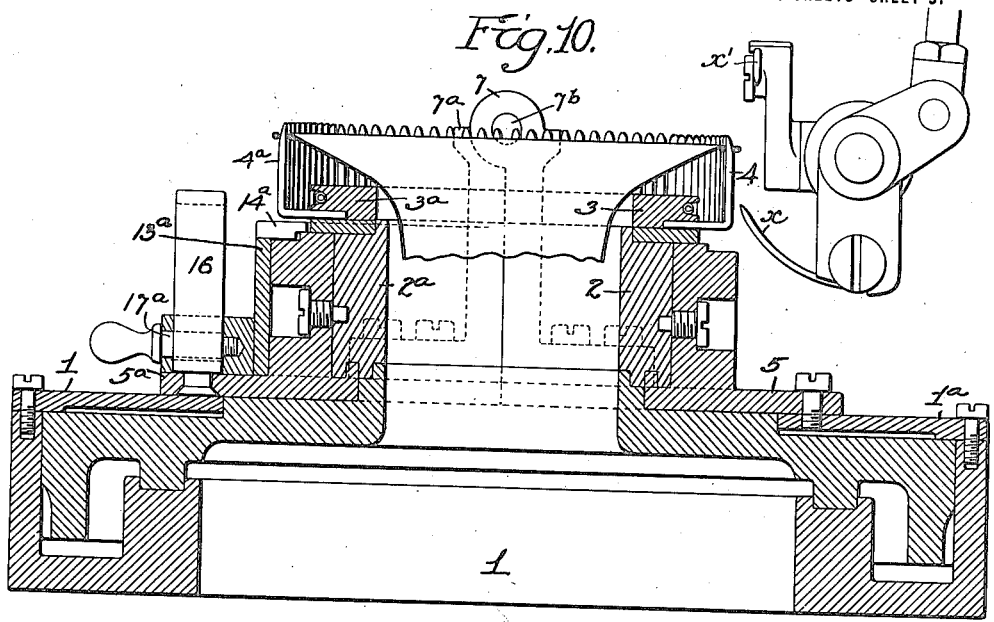
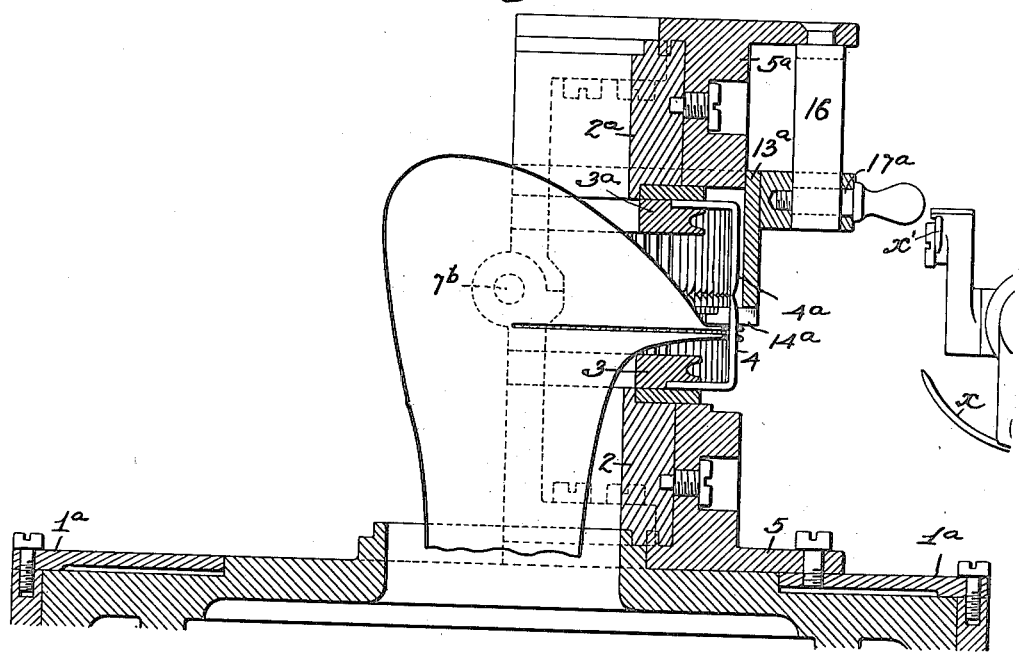

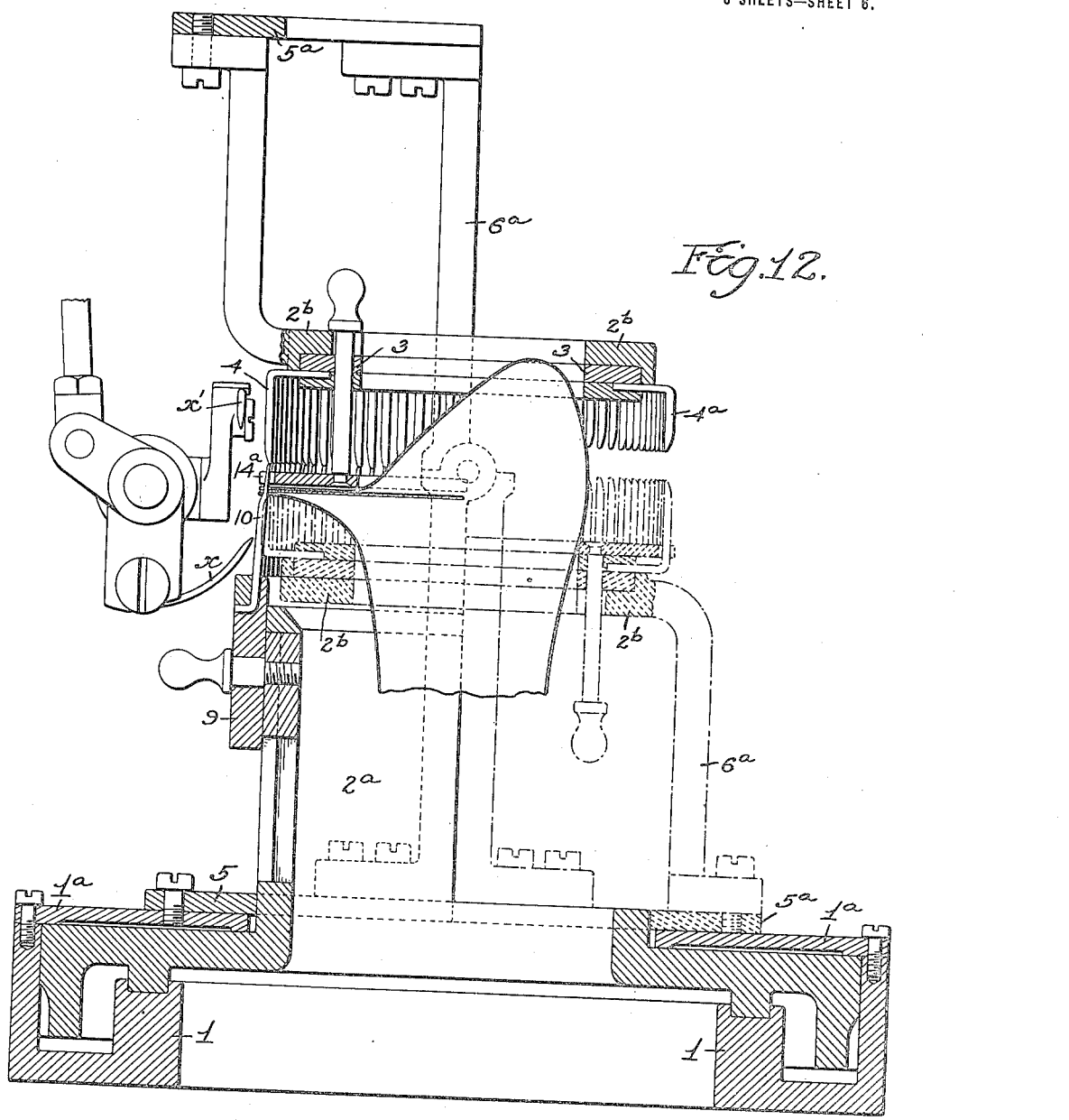

UNITED STATES PATENT OFFICE.

LOUIS N. D. WILLIAMS, OF OGONTZ, PENNSYLVANIA.

MACHINE FOR UNITING KNITTED WEBS.

1,239,241. Specification of Letters Patent. Patented Sept. 4, 1917.

Application filed January 20, 1916, Serial No. 73,116. Renewed February 6, 1917. Serial No. 146,986.

*To all whom it may concern:*

Be it known that I, LOUIS N. D. WILLIAMS, a citizen of the United States, residing in Ogontz, Pennsylvania, have invented certain Improvements in Machines for Uniting Knitted Webs, of which the following is a specification.

The object of my invention is to effect, at minimum expense, the uniting of the stitches around one half of the end of a knitted web to those around the other half of said end, as for instance, the stitches extending around the sole portion of the toe pocket of an article of hosiery to those around the instep portion of the same, and my invention comprises mechanical means for receiving the stitches from the needles of the machine upon which the web was produced, doubling the stitches around one half of said web with those around the other half of the same, and then uniting these doubled stitches so as to close the end of the web.

In the accompanying drawings—

Figs. 2, 3 and 4 are transverse sections of the same on the line $a$—$a$, Fig. 1, showing certain movable parts in different positions of adjustment in the different views and showing also the looping devices, but omitting certain stripper fingers shown in Fig. 1;

Fig. 5 is a view similar to Fig. 4, but showing a stitch doubling operation which is the reverse of that shown in said figure, and showing also a reverse disposition of the looping devices necessitated thereby;

Fig. 6 is a sectional view of a machine of the type shown in Fig. 5, but showing the rotatable members of the machine moved to the extent of a quarter-turn from that there represented, and showing also the points from which the stitches have been transferred restored to their normal position;

Fig. 7 is a horizontal section on the line $b$—$b$, Fig. 6, but on a smaller scale;

Fig. 8 is a view similar to part of Fig. 7, but illustrating certain of the parts in a different position from that there shown;

Fig. 9 is a side elevation of one of the parts shown in Figs. 7 and 8;

Figs. 10 and 11 are views similar, respectively, to Figs. 3 and 4, but illustrating a modified form of the device, and Fig. 12 is a view similar to Fig. 5, but illustrating a further modification.

Figure 1:
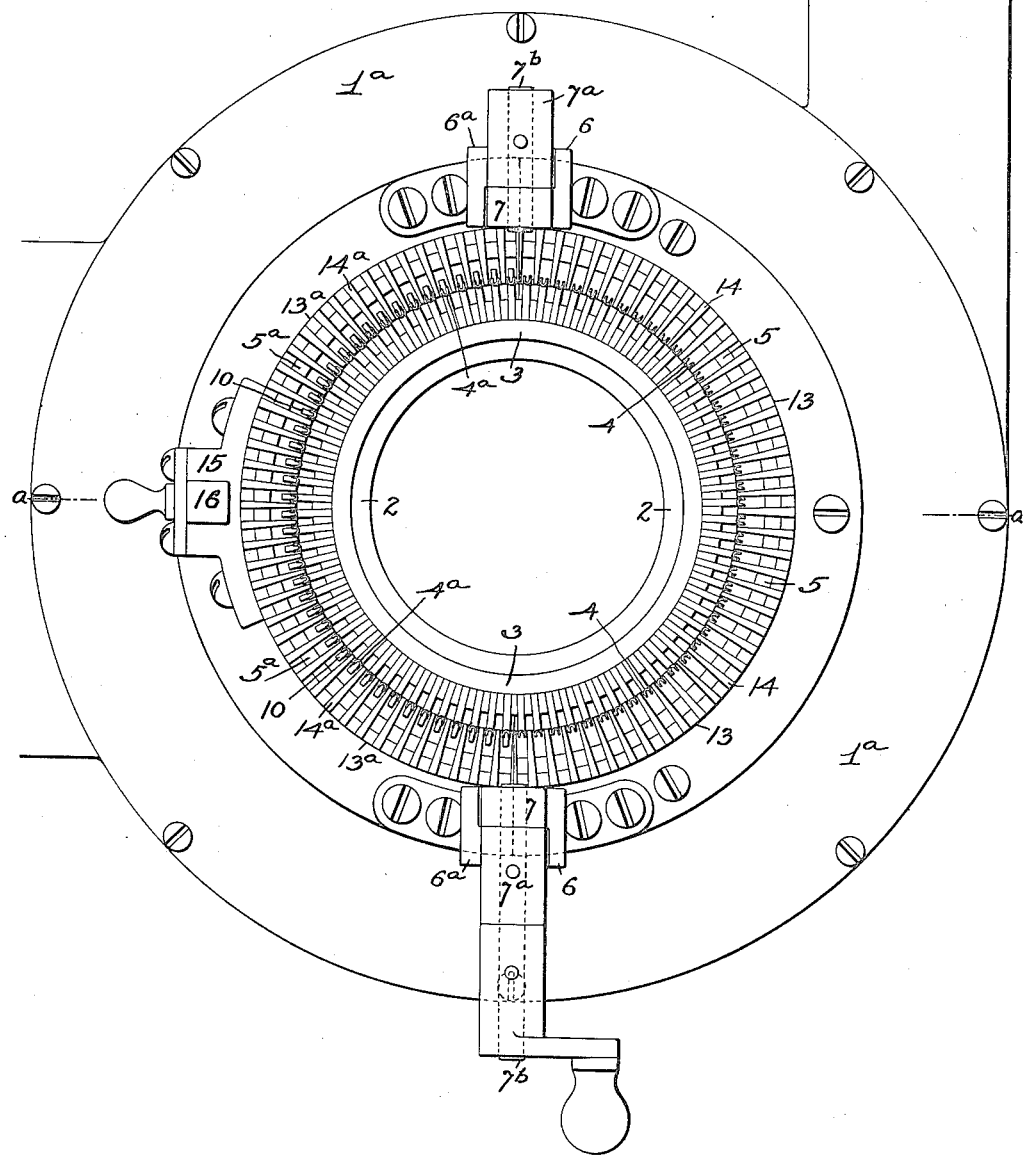
Figure 1 is a top view of a machine constructed in accordance with my invention, but omitting the looping devices.

The machine, when intended for use in connection with circular knitting machines, is provided with stitch receiving points disposed in a circle and mounted in a point ring. My invention, however, in its broader embodiment is not limited to this construction.

As shown in Figs. 1 to 4, inclusive, of the drawings, 1 represents a fixed base structure upon which is mounted, so as to be free to rotate, a cylinder 2, the latter having at the top a seat for the reception of a ring 3 which carries a circularly disposed set of stitch receiving points 4, 4ª, said ring structure being continuous and, although seated on the cylinder 2 so as to partake of any movement imparted to the latter, being readily removable from said cylinder.

The cylinder 2 may have intermittent movements of partial rotation imparted to it by any suitable means, such, for instance, as shown in Letters Patent 1,069,336, dated August 5, 1913, and the stitch receiving points mounted on said cylinder coöperate with looping needles $x$, $x'$, similar to those shown in said patent, these looping needles being so disposed in respect to the points of the point ring that they will not only unite the stitches of each pair carried by a point but will also form a chain of stitches uniting the successive pairs of stitches carried by a set of points.

The base 1 has a fixed cover plate 1ª and upon the latter is mounted an annular structure comprising a fixed semi-annular member 5 and a swinging semi-annular member 5ª, each of these members having secured to it a hinge member 6 or 6ª (Figs. 2, 3 and 4). The hinge members 6, 6ª have at the top, overlapping ears 7, 7ª (Fig. 1) which are hinged together by means of a central pivot pin 7ᵇ, so that the member 5ª can be adjusted in line horizontally with the member 5, as shown in Figs. 2 and 3, or can be swung over into a plane parallel with but above said member 5, as shown in Fig. 4.

In the member 5ª is formed a semi-annular vertical guideway 8 for the reception and guidance of a semi-annular carrier 9 for a semi-circular series of transfer points 10 which register with and fit snugly to the stitch receiving points 4ª, lifting movement being imparted to the carrier 9 and its transfer points 10 by means of a stem 11 mounted so as to move vertically in a depending boss 12 on the base of the cylinder 2, as shown in Figs. 2 and 3.

Mounted upon the semi-annular segment 5ª is a semi-annular sleeve 13ª which carries at the top a semi-annularly disposed series of stripper fingers 14ª, which project between and coöperate with the stitch transfer points 10.

The stitch receiving points 4ª are, by preference, shorter than the points 4 and, in order to properly guide and retain the sleeve 13ª and its stripper fingers 14ª in their movements, said sleeve 13ª is provided with a guide box 15 adapted to slide upon a projecting stud 16 on the base flange of the annular segment 5ª, said stud being slotted for the reception of a stem 17ª whereby the movements of the sleeve 13ª are effected.

Before the point carrying ring 3 is mounted upon the cylinder 2 the stitch receiving points 4 and 4ª have removed the stitches from the needles of the knitting machine, the point ring 3, with the stitches upon its points, being then applied to the cylinder 2 when the parts are in the position shown in Fig. 2. The stitch transfer points 10 are then raised from the position shown in Fig. 2 to that shown in Fig. 3 so that each point 10 will enter the stitch upon a corresponding point 4ª and will project above said points with their upper ends in line with the upper ends of the points 4, as shown in Fig. 3.

The segment 5ª and the parts carried thereby is then swung from the position shown in Figs. 2 and 3 to that shown in Fig. 4 so as to fold that portion of the web formerly carried by the points 4ª over onto the portion still carried by the points 4. The points 10 now register with the corresponding points 4, and the stripping fingers 14ª are projected so as to strip the stitches from the transfer points 10 and force them onto the stitch receiving points 4, as shown in Fig. 4, and thereby double them on the points 4 with the stitches already carried by said points. Previous to this action the looping mechanism may be moved outwardly from the points 4, as shown in Fig. 4, so as not to interfere with the transfer of the stitches from the points 10 to the points 4.

The segment 5ª and the parts carried thereby are then restored to their original position, as shown in Fig. 2, and (the looping mechanism having been restored to its normal relation to the points 4 and the cylinder 2 given a quarter turn so as to bring the first point 4 of the series into line with said looping mechanism) the doubled stitches upon said points 4 are united by means of the looping mechanism, successive pairs of stitches being brought into line with the looping mechanism by imparting intermittent movements of partial rotation to the cylinder 2.

Instead of transferring the stitches from the points 10 onto the points 4, as before described, the stitches may be transferred from the points 4 onto the points 10, if desired, and, after said points 4 have been restored to their original position, the cylinder 2 may be turned to the extent of a quarter turn, as shown in Fig. 6, so as to bring the doubled stitches upon the first of the series of points 10 into position for being united by the looping devices, the latter being adjusted to their normal relation to the points 10, as shown in Fig. 6.

In the construction shown in Fig. 5 the point carrying ring 3 is split so as to permit the points 4 to be folded over into registry with the points 10, in order to permit transfer of stitches from one to the other, but this is not essential, for as shown in Fig. 12 the entire ring may, after the transfer of the stitches from the points 4ª to the points 10, be reversed in position so as to cause the points 4 to register with said points 10 for the purpose of stripping the stitches from said points 4 onto the points 10, or the reverse, as desired. In the construction shown in Fig. 12 the structure upon which the point carrying ring 3 is mounted is itself in the form of a ring carried by the swinging member 5ª, and the cylinder 2 is replaced by a segment 2ª slotted for the guidance of the segment 9 which carries the points 10.

When the method of operation shown in Figs. 5 and 6 is employed, some means for supporting the segment 9 during the looping operation should be provided. As an instance of such supporting means, I have shown in Figs. 5 to 9 a flanged segment 20, mounted on the member 5 so as to be susceptible of a limited amount of turning movement thereon, the flange of said segment 20 having pivotally mounted thereon a series of fingers 21, which project through slots in the member 5, and when the segment 20 is in the position shown in Figs. 5, 6 and 7 are projected into the guideway 8 beneath the segment 9 so as to support the latter, but when said segment 20 is moved to the position shown in Fig. 8, will be withdrawn from said guideway 8 so as to permit of the lowering of the segment 9 and its points 10 from the position shown in Figs. 5 and 6 to that shown in Fig. 2, the member 5 being slotted as shown at 22 in Fig. 7, for the action of the means whereby downward pressure is exerted upon said segment 9 for this purpose.

I prefer, in all cases, to mount the stitch receiving points in a continuous ring structure because of the facility with which the latter can be applied to and removed from the knitting machine cylinder or the cylinder 2, and to employ in connection with the fixed set of stitch receiving points 4ª a corresponding set of swinging transfer points 10. In Figs. 10 and 11, however, I have illustrated a construction in which the transfer points 10 and their appurtenances have been omitted, the stitch receiving point ring, the cylinder upon which it is mounted, and the cylinder surrounding the latter being all composed of semi-annular segments, as shown, respectively, at 3, 3ª, 2, 2ª and 5, 5ª, whereby the stitch receiving points 4ª may be turned over so as to register with the corresponding stitch receiving points 4, as shown in Fig. 11, the stitches carried by said points 4ª being then stripped therefrom and forced onto the corresponding points 4 so as to be doubled with the stitches already upon the latter, the segments 2ª, 3ª and 5ª, and the parts carried thereby being then restored to their original positions preparatory to the looping together of the pairs of stitches upon the points 4.

In this type of machine the points 4 and 4ª are of the same length.

I am aware of the patent of Walter D. Butz, No. 1,068,853, dated July 29, 1913, in which is shown a stitch transferring and doubling device comprising two semi-annular structures each carrying a semi-circular set of stitch receiving points and also provided with hinges whereby the points of one half of the set can be turned over into registry with the corresponding points of the other half of the set. In many cases, however, it is advisable to mount the point carrying ring in the top of the needle cylinder of the knitting machine and to permit it to remain there during the knitting of the web, and, in such case, the formation of the hinges upon the same structure as the point carrying ring is objectionable since said hinges interfere with the free delivery of the knitted web from the needles during the knitting operation.

Even when the stitch receiving points are applied to the stitches from above, after the completion of the knitted web, the hinges are in the way.

The present device is, therefore, provided with a special hinge structure to which the point ring can be applied after having received the stitches from the needles of the knitting machine and from which said point ring can be readily removed when the stitches have been doubled upon one set of the points and united by the looping mechanism.

The one-piece point ring, with which coöperates the semi-circular set of transfer points 10, is also preferable to a two-part ring because of the lessened liability to error in effecting transfer of stitches from the needles to the points or from one half of the original stitch receiving points to the other.

When the point carrier is composed of separate halves as shown in Figs. 10 and 11, I find it advisable in some cases to pivot both halves of the carrier, so that they can be swung over one another, as the use of single thread chains on opposite sides of the row of united stitches is, in many cases, preferable to the use of a double thread chain on one side of the same.

It will be evident that when the point carrier and the cylinder 2 are composed of opposite segments, as shown in Figs. 10 and 11, it is immaterial on which side of the cylinder the hinge structure is located.

In any event the structure 3—3ª which carries the points is separate from the structure 5—5ª which carries the pivots, hence said pivots can be so disposed as not to interfere with the engagement of the web by said points or with the subsequent folding of the web and transfer of stitches from one half of the points to the opposite half of the same.

I claim:—

1. The combination of a set of stitch receiving points, a carrier therefor, a structure separate from said point carrier and comprising two members having hinge connection between them, whereby one part may be folded over the other, and means for transferring stitches from one section of points to the other, said means being carried by that part of the pivot structure which is thus folded.

2. The combination of a set of stich receiving points, a carrier therefor, a set of stitch transferring points for removing the stitches from one half of the original stitch receiving points, and means for registering said stitch transferring points and the other half of the original stitch receiving points to permit transfer of stitches from one to the other.

3. The combination of a set of stitch receiving points of which one half are shorter than those of the other half, a series of stitch transferring points in registry with the short stitch receiving points and serving to remove the stitches therefrom, and means for bringing said transfer points into registry with the long stitch receiving points to permit transfer of stitches from one to the other.

4. The combination, of a circularly disposed series of stitch receiving points, a continuous ring carrier therefor, a semi-circular series of stitch transferring points coöperating with one half of the stitch receiving points of said continuous ring carrier and serving to remove the stitches therefrom, and means for bringing said semi-circular series of stitch transferring points into registry with the other semi-circular series of original stitch receiving points to permit transfer of stitches from one to the other.

5. The combination of a set of stitch receiving points, a carrier therefor, a series of stitch transferring points coöperating with one half of the stitch receiving points and serving to transfer the stitches therefrom, and means for swinging said transfer points over into registry with the opposite half of the original stitch receiving points so that the stitches may be transferred from one to the other.

6. The combination of a set of stitch receiving points, means for transferring stitches from one half of said points to the other half of the same, and looping mechanism coöperating with the latter points so as to unite to one another the double stitches thereupon.

7. The combination of a series of stitch receiving points, a set of transfer points whereby the stitches can be removed from one half of said stitch receiving points, means for registering said transfer points with the other half of the original series of stitch receiving points so as to permit transfer of the stitches from one set to the other, and looping mechanism coöperating with the latter points so as to unite to one another the double stitches thereupon.

8. The combination of a circularly disposed series of stitch receiving points, a continuous ring carrier for said points, a set of transfer points whereby the stitches can be removed from one half of the circle of stitch receiving points, means for registering said transfer points with the other half of the original series of stitch receiving points, so as to permit transfer of the stitches from one set to the other, and looping mechanism coöperating with the latter points so as to unite to one another the double stitches thereupon.

In testimony whereof, I have signed my name to this specification, in the presence of two subscribing witnesses.

LOUIS N. D. WILLIAMS.

Witnesses:
 KATE A. BEADLE,
 HAMILTON D. TURNER.